(12) United States Patent
Todd

(10) Patent No.: US 8,358,455 B2
(45) Date of Patent: Jan. 22, 2013

(54) DATA INTEGRITY METHODS FOR QUANTUM COMPUTATIONAL PLASMONIC INFORMATION REPRESENTATION AND PROCESSING SYSTEMS

(76) Inventor: Jake Adam Todd, Seattle, WA (US)

(*) Notice: Subject to any disclaimer, the term of this patent is extended or adjusted under 35 U.S.C. 154(b) by 357 days.

(21) Appl. No.: 12/855,695

(22) Filed: Aug. 13, 2010

(65) Prior Publication Data

US 2012/0042194 A1    Feb. 16, 2012

(51) Int. Cl.
*G06E 3/00* (2006.01)
*G02F 3/00* (2006.01)
(52) U.S. Cl. ........................................ 359/107; 359/108
(58) Field of Classification Search .................. 359/107, 359/108
See application file for complete search history.

(56) References Cited

U.S. PATENT DOCUMENTS

| 7,346,248 | B2 | 3/2008 | Atwater et al. |
| 7,417,219 | B2 | 8/2008 | Catrysse et al. |
| 8,111,440 | B2 * | 2/2012 | Wang et al. ................. 359/237 |
| 2010/0149540 | A1 | 6/2010 | Boukherroub et al. |

OTHER PUBLICATIONS

Sander, M. S. et al., Journal of Applied Physics, vol. 89, No. 5, "Plasmon excitation modes in nanowire arrays" (Mar. 1 2001).

* cited by examiner

*Primary Examiner* — Jade R Chwasz

(57) ABSTRACT

Data integrity methods are disclosed for quantum computational plasmonic information representation and processing systems. Also disclosed are methods of saving energy in such applications. Also disclosed are methods of monitoring such applications.

8 Claims, 9 Drawing Sheets

DATA INTEGRITY METHODS FOR QUANTUM COMPUTATIONAL PLASMONIC INFORMATION REPRESENTATION AND PROCESSING SYSTEMS

BACKGROUND—PRIOR ART

U.S. Patents

| Pat. No. | Issue Date | Patentee |
| --- | --- | --- |
| 7,417,219 | 2008 Aug. 26 | Catrysse, et al. |
| 7,346,248 | 2008 Apr. 18 | Atwater, et al. |

U.S. Patent Application Publications

| Publication Nr. | Publ. Date | Applicant |
| --- | --- | --- |
| 20100149540 | 2010 Jun. 17 | Boukherroub, et al. |

Nonpatent Literature Documents
Sander, M. S. et al., *Journal of Applied Physics, Volume* 89, Number 5, "Plasmon excitation modes in nanowire arrays" (Mar. 1, 2001)

DRAWINGS—FIGURES

A drawing of every permutation in every context would require thousands of drawings. The following drawings provide enough detail in order to understand my invention, although the Claims define specifically all the methods of my invention. The context for the drawings is a plasmon gate array system with the energy propagating in alternating photon and plasmon form. The context is not intended to indicate a best mode contemplated.

DRAWINGS—REFERENCE NUMERALS

Figure 1:
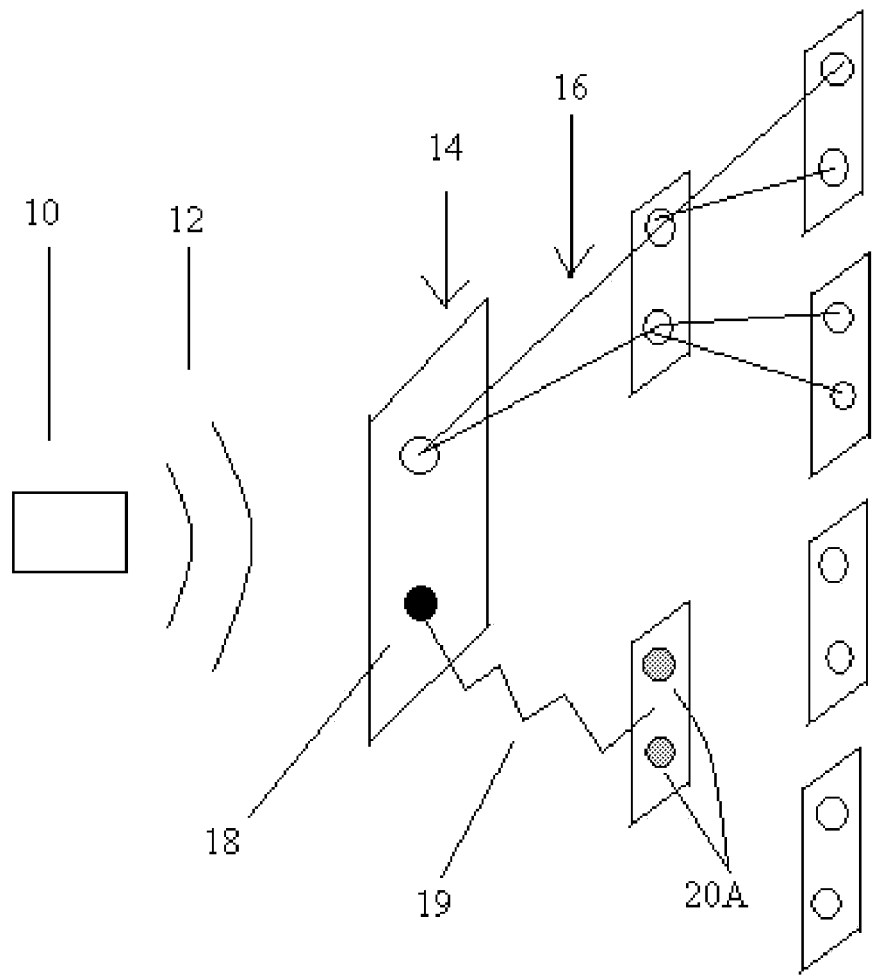
FIG. 1 shows a primary obstruction to a nanohole in a nanofilm in a first set of nanofilms, and further obstruction in a nanofilm's nanoholes in a second set of nanofilms.

10 photon emitter
12 emitted photons
13 external computational system in communication with and control of primary obstruction and/or primary obstructions and/or additional obstruction, and/or additional obstructions, and receiving reporting from photon detection and plasmon detection
14 plasmon-supporting nanofilms with plasmon-supporting nanoholes that lead plasmons to the back side of the nanofilm
16 paths that photons and plasmons take throughout this example system
18 primary obstruction
19 intrinsic function of the primary obstruction to make a further obstruction or obstructions
20A further obstruction in the bottom nanofilm of the second set of nanofilms
20B further obstruction in the bottom two nanofilms of the third set of nanofilms
20C further obstruction in the bottom nanofilm of the third set of nanofilms
22 photon detection, immediately before the area of further obstructions, reporting to the external computational system
24 photon detection, immediately before the area of primary obstruction, reporting to the external computational system
26 photon detection, immediately after the area of further obstruction, reporting to the external computational system
28 photon detection, immediately after the area of primary obstruction, reporting to the external computational system
30 a plasmon heading towards a nanohole
32 plasmon detection, reporting to the external computational system
34 a malfunctioning primary obstruction that has let a plasmon through
36 a plasmon that has passed through the malfunctioning primary obstruction and has not changed state to a photon yet

DETAILED DESCRIPTION

The Figures illustrate example embodiments of the claims and should not be seen as limiting the claims in any way.

The operation and components of the example embodiments, for example the nanofilms supportive of plasmons, should be familiar to one skilled in the art. Additionally, a review of the Prior Art should familiarize one to the components in the following example systems. At present, I contemplate the use of a polymethylmethacrylate dielectric onto gold film and supported by glass substrate for the nanofilms mentioned in the following embodiments, but other materials are suitable. I can not, in my judgment, choose a preferred embodiment because of the numerous permutations and the difficulty in choosing one as most useful. I will describe some of the ways my invention could work in the following embodiments.

First Embodiment—FIG. 1

FIG. 1 shows a photon emitter (10), photons emitted from the photon emitter (12), sets of nanofilms each with two nanoholes (14), the paths photons and plasmons take through the system (16), a primary obstruction of a nanohole in the first set of nanofilms (18), and a further obstruction of two nanoholes in a nanofilm in the second set of nanofilms (20A), with the further obstruction done by the intrinsic function of the primary obstruction (19).

Operation of First Embodiment—FIG. 1

Photons incident (12) on the nanofilm in the first set of nanofilms convert to plasmon form and propagate along the surface of the nanofilm. The plasmons reach the two nanoholes in the nanofilm. The top nanohole does not have an obstruction applied to it, so the plasmons propagate through the top nanohole, onto the back side of the nanofilm, and convert to photon form. These photons propagate (16) to the top nanofilm in the second set of nanofilms. Since there is no obstruction in that nanofilm, the photons convert to plasmon form and propagate through the two nanoholes, and then back to photon form. These photons are then incident (16) on the top two nanofilms in the third set of nanofilms, change to plasmon form, and go through the nanoholes in the two nanofilms. The bottom nanohole in the nanofilm in the first set of nanofilms has a primary obstruction (18) implemented by the quantum computational components. If that primary obstruction (18) is operating properly, no plasmons will be able to propagate through that nanohole. However, if the primary obstruction for that nanohole (18) is not working correctly, the system can still output the same data by using further obstruction (20A) for the two nanoholes in the bottom nanofilm in the second set of nanofilms, implemented by the intrinsic function of the primary obstruction (19). This makes the effective output represent the same data and operations on data as if the primary obstruction (18) were working correctly. You do not need to replace every part that is malfunctioning; this example system can be adaptive to continue functioning properly, with minimal loss of processing and/or data representation power.

Figure 2:
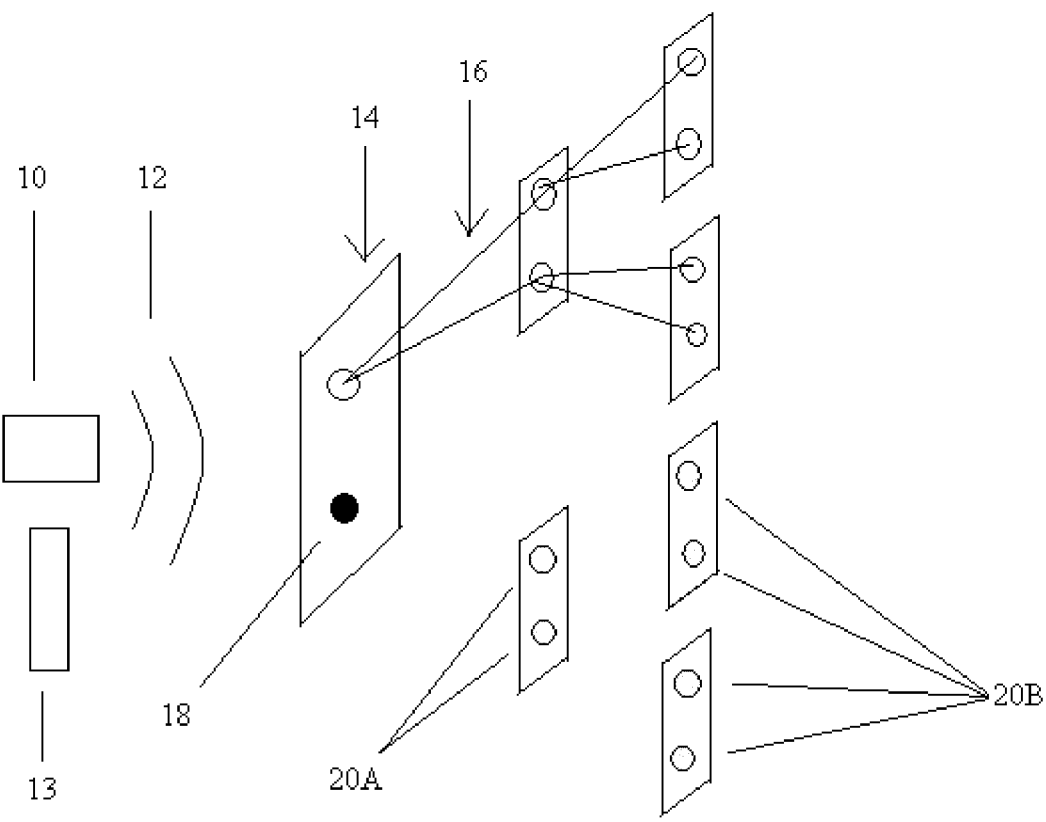
FIG. 2 shows a primary obstruction to one of the nanoholes in the first nanofilm, and further obstruction in a nanofilm's nanoholes in the second set of nanofilms, and further obstruction in two nanofilm's nanoholes in a third set of nanofilms.

Second Embodiment—FIG. 2

FIG. 2 shows a photon emitter (10), photons emitted from the photon emitter (12), sets of nanofilms each with two nanoholes (14), the paths photons and plasmons take through the system (16), a primary obstruction of a nanohole in the first set of nanofilms (18), further obstruction (20A) of the nanoholes in a nanofilm in the second set of nanofilms, further obstruction (20B) of the nanoholes in two nanofilms in the third set of nanofilms, and an external computational system (13).

Operation of Second Embodiment—FIG. 2

The photons incident (12) on the nanofilm in the first set of nanofilms convert to plasmon form and propagate along the surface of the nanofilm. The plasmons reach the two nanoholes in the nanofilm. The top nanohole does not have obstruction applied to it, so the plasmons propagate through the top nanohole, onto the back side of the nanofilm, and convert to photon form. These photons propagate (16) to the top nanofilm in the second set of nanofilms. Since there is no obstruction in that nanofilm, the photons convert to plasmon form and propagate through the two nanoholes, and then back to photon form. These photons are then incident (16) on the top two nanofilms in the third set of nanofilms, change to plasmon form, and go through the nanoholes in the two nanofilms. The bottom nanohole in the nanofilm in the first set of nanofilms has a primary obstruction (18) implemented by the external computational system (13). If that primary obstruction (18) is operating properly, no plasmons will be able to propagate through that nanohole. However, if the primary obstruction for that nanohole (18) is not working correctly, the system can still output the same data by using further obstruction (20A and 20B), implemented by the external computational system (13), for the nanoholes in the bottom nanofilm in the second set of nanofilms and for the nanoholes in the bottom two nanofilms in the third set of nanofilms. Furthermore, if the primary obstruction (18) in the bottom nanohole of the first nanofilm is known by the external computational system (13) not to function, energy can be saved by skipping the step of trying to apply obstruction to the nanohole and, instead, rely on the further obstruction (20A and 20B) in the nanoholes in the bottom nanofilm in the second set of nanofilms and in the nanoholes in the bottom two nanofilms in the third set of nanofilms, making the effective output represent the same data and operations on data as if the primary obstruction (18) were working correctly. Also, if the primary obstruction (18) and the further obstruction in the nanoholes in the bottom nanofilm of the second set of nanofilms (20A) are not functioning properly, then the external computational system (13) can rely on the further obstruction in the nanoholes of the bottom two nanofilms in the third set of nanofilms (20B). Also, the external computational system (13) can do this while saving the energy of trying to make the primary obstruction (18) and further obstruction in the bottom nanofilm of the second set of nanofilms (20A) and simply use the further obstruction of the nanoholes in the bottom two nanofilms in the third set of nanofilms (20B) implemented by the external computational system (13). You do not need to replace every part that is malfunctioning; this example system can be adaptive to continue functioning properly, with minimal loss of processing and/or data representation power.

Figure 3:
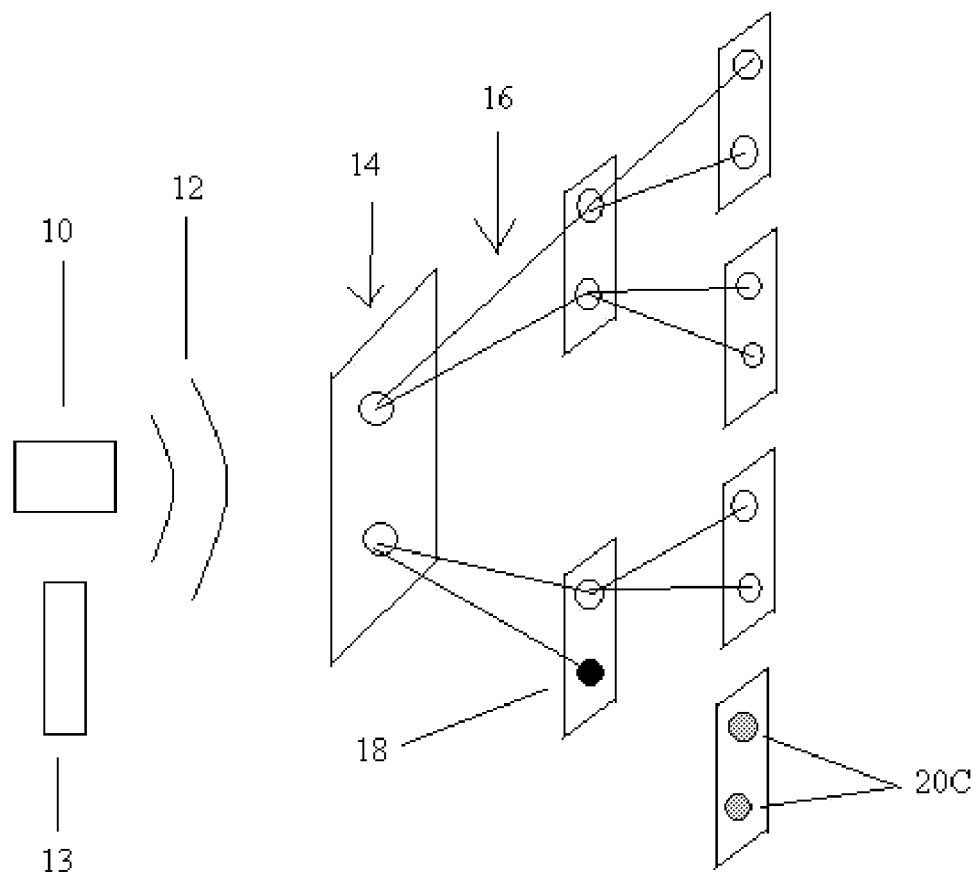
FIG. 3 shows a primary obstruction to one of the nanoholes in one of the nanofilms in the second set of nanofilms, and further obstruction in the nanoholes of one of the nanofilms in the third set of nanofilms.

Third Embodiment—FIG. 3

FIG. 3 shows a photon emitter (10), photons emitted from the photon emitter (12), sets of nanofilms each with two nanoholes (14), the paths photons and plasmons take through the system (16), a primary obstruction of a nanohole in the second set of nanofilms (18), further obstruction of the nanoholes (20C) in a nanofilm in the third set of nanofilms (18), and an external computational system (13).

Operation of Third Embodiment—FIG. 3

The photons incident (12) on the nanofilm in the first set of nanofilms convert to plasmon form and propagate along the surface of the nanofilm. The plasmons reach the two nanoholes in the nanofilm. The two nanoholes in the nanofilm in the first set of nanofilms do not have obstruction applied to them, so the plasmons propagate through the two nanoholes in the first nanofilm, onto the back side of the nanofilm, and convert to photon form. These photons propagate (16) to the two nanofilms in the second set of nanofilms. There is one primary obstruction (18) in the nanoholes of the second set of nanofilms implemented by the external computational system (13). The photons will convert to plasmon form on the second set of nanofilms. The plasmons will propagate through the three nanoholes that do not have an obstruction applied to them in the second set of nanofilms. These plasmons will propagate along the back side of the nanofilms and convert to photon form. These photons will be incident (16) on the top three nanofilms in the third set of nanofilms. If the primary obstruction (18) is operating properly, then no plasmons will propagate through that nanohole. However, if the primary obstruction (18) is not operating properly, then the further obstruction (20C), implemented by the external computational system (13), will allow the system can to still output the same data as if the primary obstruction (18) were functioning properly. Furthermore, if the primary obstruction (18) in the bottom nanohole of the bottom nanofilm in the second set of nanofilms is known by the external computational system (13) not to function, energy can be saved by skipping the step of trying to apply obstruction to that nanohole and, instead, rely on the further obstruction (20C), implemented by the external computational system (13), making the effective output represent the same data and operations on data as if the primary obstruction (18) were working correctly. Also, the external computational system (13) can do this while saving the energy of trying to make the primary obstruction (18) and simply use the further obstruction of the nanoholes in the bottom nanofilm in the third set of nanofilms (20C), implemented by the external computational system (13). You do not need to replace every part that is malfunctioning; this example system can be adaptive to continue functioning properly, with minimal loss of processing and/or data representation power.

Figure 4:
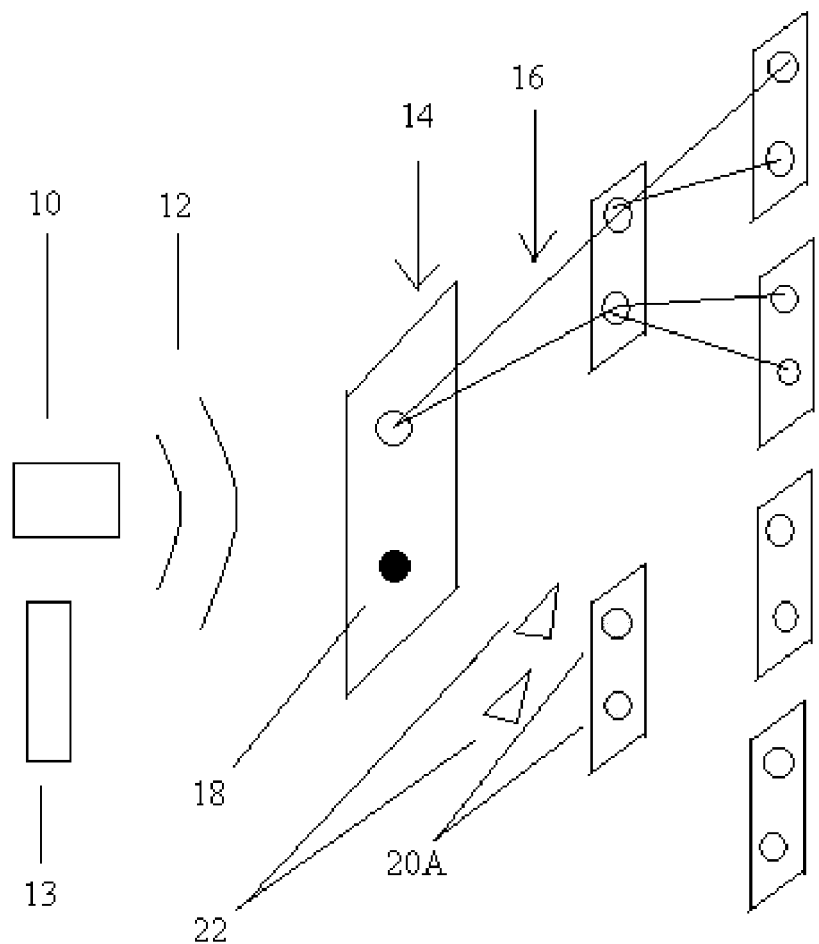
FIG. 4 shows a primary obstruction to a nanohole in a nanofilm in a first set of nanofilms, and further obstruction in a nanofilm's nanoholes in a second set of nanofilms, and photon detection immediately before the area of further obstruction.

Fourth Embodiment—FIG. 4

FIG. 4 shows a photon emitter (10), photons emitted from the photon emitter (12), sets of nanofilms each with two nanoholes (14), the paths photons and plasmons take through the system (16), a primary obstruction of a nanohole in the first set of nanofilms (18), further obstruction of two nanoholes in a nanofilm in the second set of nanofilms (20A), and photon detection (22), immediately before the area of further obstructions in the bottom nanofilm in the second set of nanofilms, and an external computational system (13).

Operation of Fourth Embodiment—FIG. 4

The photons incident (12) on the nanofilm in the first set of nanofilms convert to plasmon form and propagate along the surface of the nanofilm. The plasmons reach the two nanoholes in the nanofilm. The top nanohole does not have obstruction applied to it, so the plasmons propagate through the top nanohole, onto the back side of the nanofilm, and convert to photon form. These photons propagate (16) to the top nanofilm in the second set of nanofilms. Since there is no obstruction in that nanofilm, the photons convert to plasmon form and propagate through the two nanoholes, and then back to photon form. These photons are then incident (16) on the top two nanofilms in the third set of nanofilms, change to plasmon form, and go through the nanoholes in the two nanofilms. The bottom nanohole in the nanofilm in the first set of nanofilms has a primary obstruction (18) implemented by the external computational system (13). If that primary obstruction (18) is operating properly, no plasmons will be able to propagate through that nanohole. If the primary obstruction (18) is operating correctly, then the photon detection (22), reporting to the external computational system (13), should not detect any photons. If photons are detected and reported, the external computer system knows that there is a problem with the primary obstruction.

Figure 5:
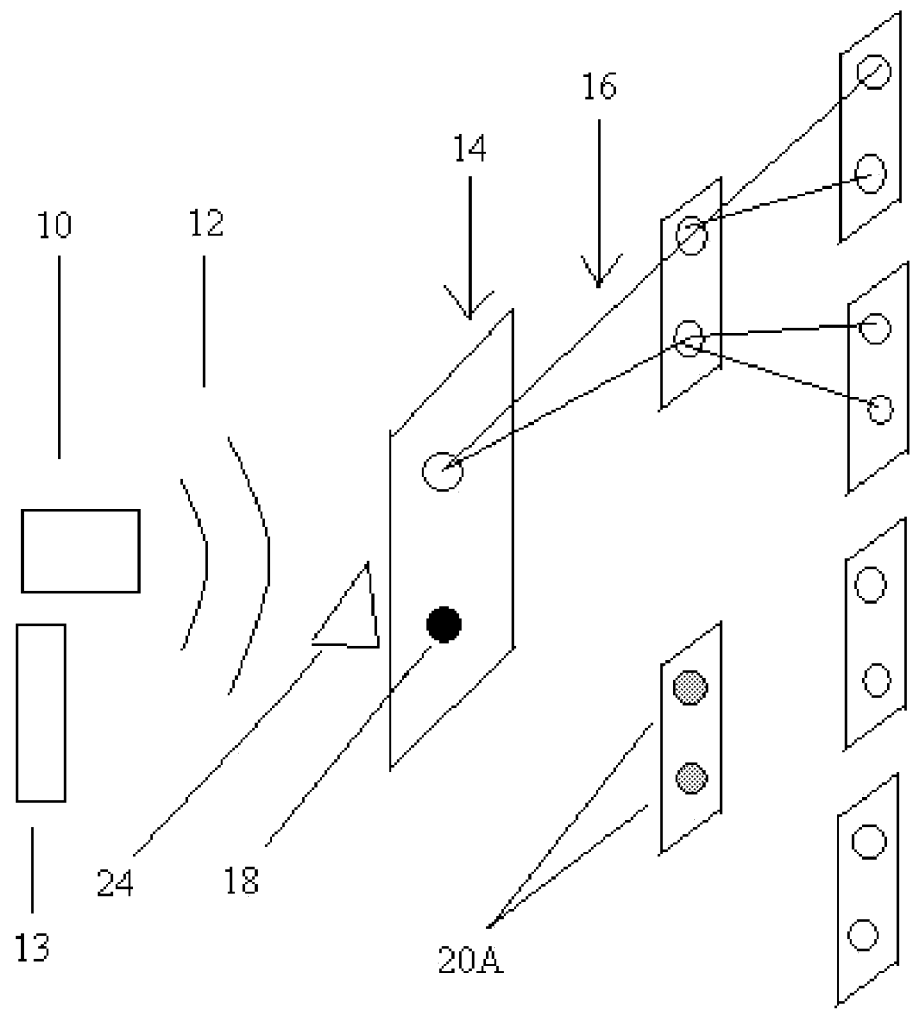
FIG. 5 shows a primary obstruction to a nanohole in a nanofilm in a first set of nanofilms, and further obstruction in a nanofilm's nanoholes in a second set of nanofilms, and photon detection immediately before the area of primary obstruction.

Fifth Embodiment—FIG. 5

FIG. 5 shows a photon emitter (10), photons emitted from the photon emitter (12), sets of nanofilms each with two nanoholes (14), the paths photons and plasmons take through the system (16), a primary obstruction of a nanohole in the first set of nanofilms (18), further obstruction of two nanoholes in a nanofilm in the second set of nanofilms (20A), and photon detection (24), immediately before the area of primary obstruction, and an external computational system (13).

Operation of Fifth Embodiment—FIG. 5

The photons incident (12) on the nanofilm in the first set of nanofilms convert to plasmon form and propagate along the surface of the nanofilm. The plasmons reach the two nanoholes in the nanofilm. The top nanohole does not have obstruction applied to it, so the plasmons propagate through the top nanohole, onto the back side of the nanofilm, and convert to photon form. These photons propagate (16) to the top nanofilm in the second set of nanofilms. Since there is no obstruction in that nanofilm, the photons convert to plasmon form and propagate through the two nanoholes, and then back to photon form. These photons are then incident (16) on the top two nanofilms in the third set of nanofilms, change to plasmon form, and go through the nanoholes in the two nanofilms. The photon detection (24), reporting to the external computational system (13), would serve to test if photons (12) from the photon emitter (10) are properly propagating to the nanofilm in the first set of nanofilms.

Figure 6:
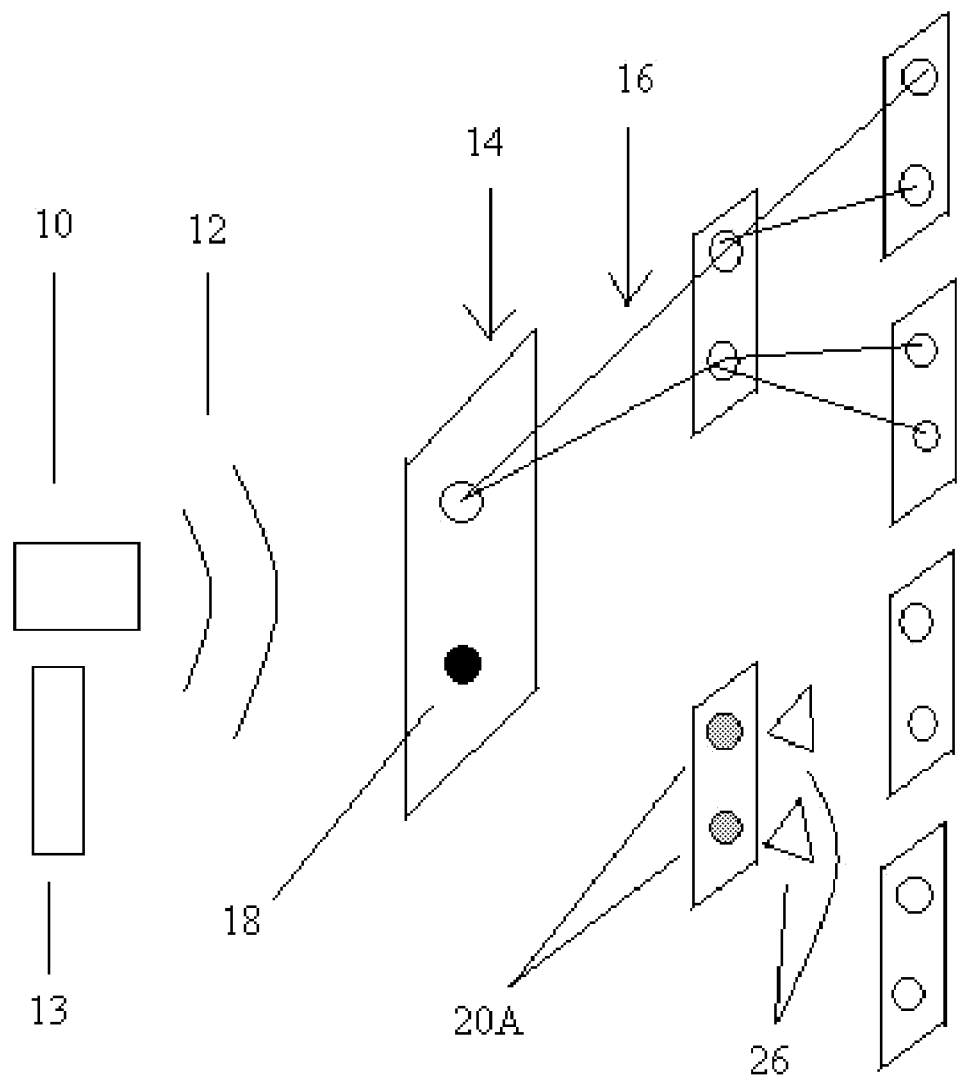
FIG. 6 shows a primary obstruction to a nanohole in a nanofilm in a first set of nanofilms, and further obstruction in a nanofilm's nanoholes in a second set of nanofilms, and photon detection immediately after the area of further obstruction.

Sixth Embodiment—FIG. 6

FIG. 6 shows a photon emitter (10), photons emitted from the photon emitter (12), sets of nanofilms each with two nanoholes (14), the paths photons and plasmons take through the system (16), a primary obstruction of a nanohole in the first set of nanofilms (18), further obstruction of two nanoholes in a nanofilm in the second set of nanofilms (20A), and photon detection (26) placed immediately after the area of further obstruction in the lower nanofilm in the second set of nanofilms, and an external computational system (13).

Operation of Sixth Embodiment—FIG. 6

The photons incident (12) on the nanofilm in the first set of nanofilms convert to plasmon form and propagate along the surface of the nanofilm. The plasmons reach the two nanoholes in the nanofilm. The top nanohole does not have obstruction applied to it, so the plasmons propagate through the top nanohole, onto the back side of the nanofilm, and convert to photon form. These photons propagate (16) to the top nanofilm in the second set of nanofilms. Since there is no obstruction in that nanofilm, the photons convert to plasmon form and propagate through the two nanoholes, and then back to photon form. These photons are then incident (16) on the top two nanofilms in the third set of nanofilms, change to plasmon form, and go through the nanoholes in the two nanofilms. If the primary obstruction (18) were to be reported as faulty, this setup could test to see if the further obstruction (20A) are operating properly in order to cause the example system to output data as if it were functioning properly. The photon detection (26) would accomplish and report this to the external computational system (13).

Figure 7:
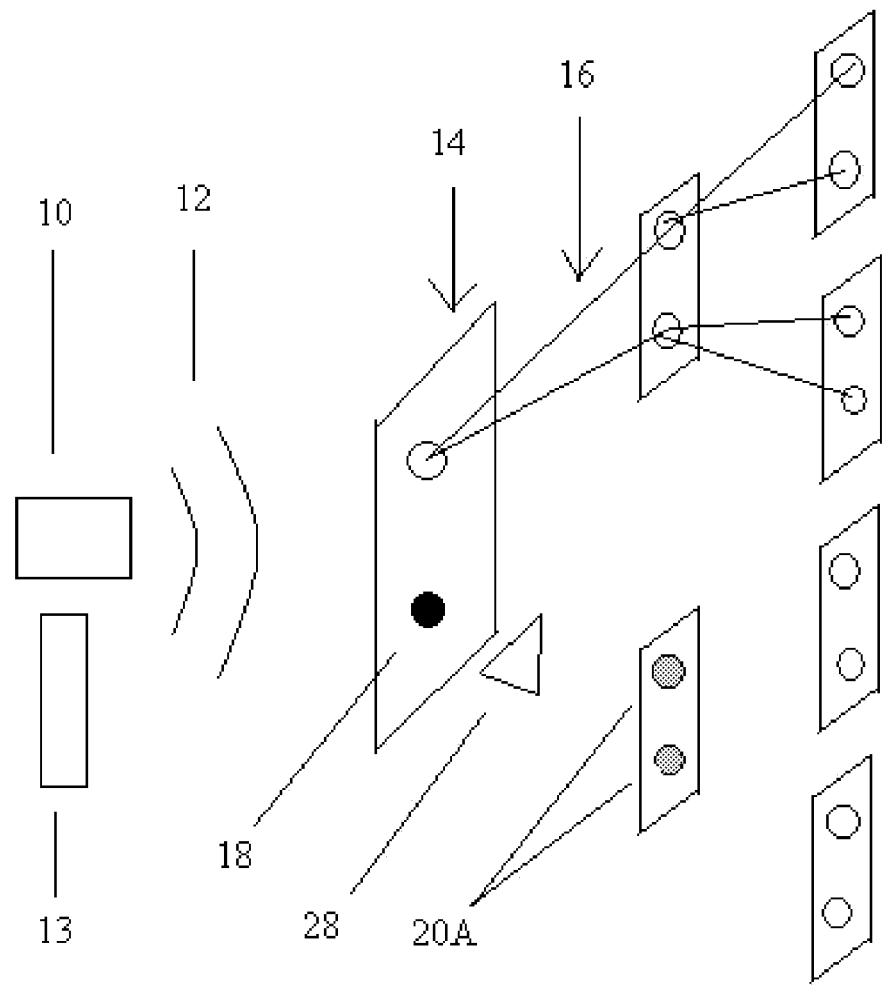
FIG. 7 shows a primary obstruction to a nanohole in a nanofilm in a first set of nanofilms, and further obstruction in a nanofilm's nanoholes in a second set of nanofilms, and photon detection immediately after the area of primary obstruction.

Seventh Embodiment—FIG. 7

FIG. 7 shows a photon emitter (10), photons emitted from the photon emitter (12), sets of nanofilms each with two nanoholes (14), the paths photons and plasmons take through the system (16), a primary obstruction of a nanohole in the first set of nanofilms (18), further obstruction of two nanoholes in a nanofilm in the second set of nanofilms (20A), and photon detection (28), immediately after the area of primary obstruction, and an external computational system (13).

Operation of Seventh Embodiment—FIGS. 4, and 7

The photons incident (12) on the nanofilm in the first set of nanofilms convert to plasmon form and propagate along the surface of the nanofilm. The plasmons reach the two nanoholes in the nanofilm. The top nanohole does not have obstruction applied to it, so the plasmons propagate through the top nanohole, onto the back side of the nanofilm, and convert to photon form. These photons propagate (16) to the top nanofilm in the second set of nanofilms. Since there is no obstruction in that nanofilm, the photons convert to plasmon form and propagate through the two nanoholes, and then back to photon form. These photons are then incident (16) on the top two nanofilms in the third set of nanofilms, change to plasmon form, and go through the nanoholes in the two nanofilms. An example use of this setup would be to first use the setup in FIG. 4, and if the setup in FIG. 4 reported to the external computational system that no photons were coming to the bottom nanofilm in the second set of nanofilms, then the setup of FIG. 7 could detect (28) and report to the external computational system if photons are even propagating off of the nanofilm in the first set of nanofilms at all. For example, if the photon detection in FIG. 4 is not detecting photons, and the photon detection in FIG. 7 were detecting photons, then it would be known by the external computational system A) that the primary obstruction is not operating correctly, and B) that the propagation angle of the photons from the back side of the nanofilm in the first set of nanofilms is faulty. This could indicate, for example, a problem in the structure of a waveguide on the back side of the nanofilm in the first set of nanofilms, where the waveguide's purpose is to aim plasmons so that when the plasmons change state to photons, they propagate properly to the nanofilm they are intended to propagate to. You could also place plasmon detection before the nanohole that is receiving the primary obstruction (18). (See FIG. 9 for more detail on this.) This would tell the external computational system if plasmons are properly propagating to the primary obstruction (18).

Figure 8:
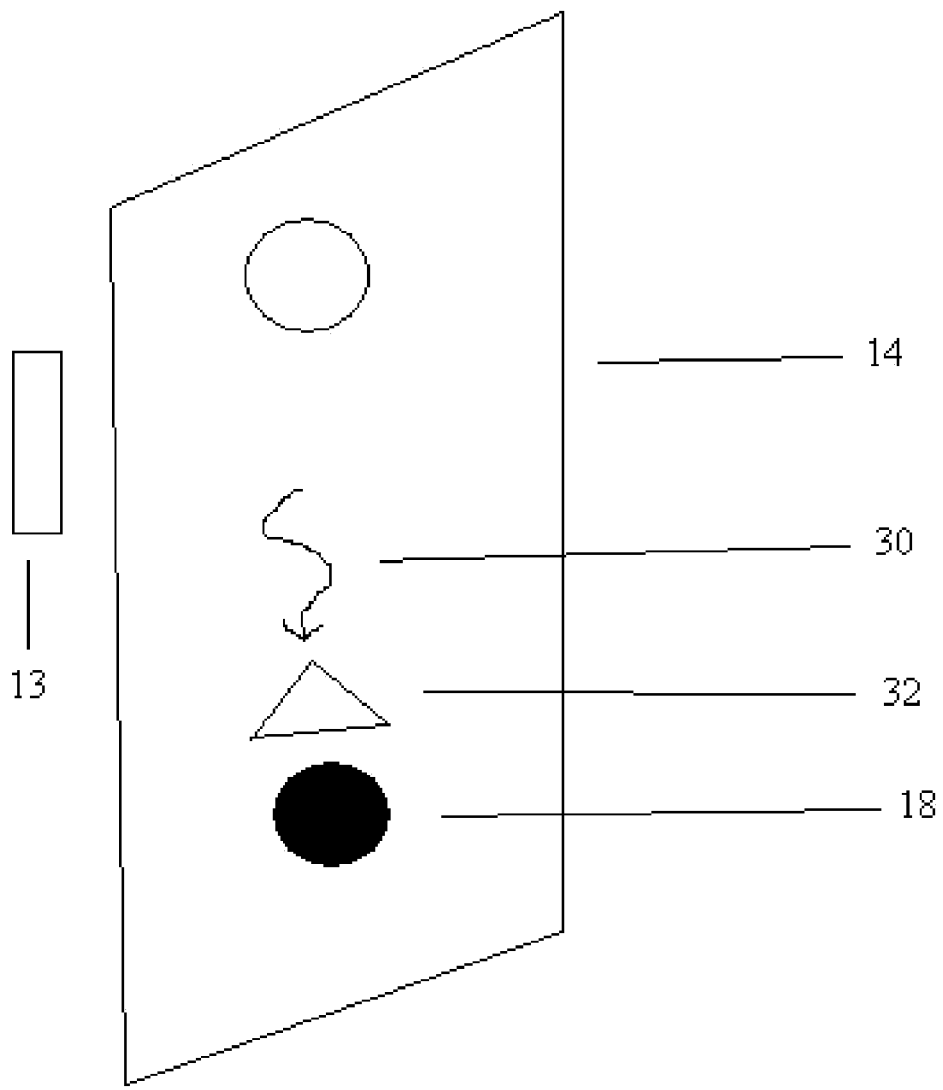
FIG. 8 shows plasmon detection immediately before the area of a primary obstruction.

Eighth Embodiment—FIG. 8

FIG. 8 shows the front side of a nanofilm (14) with two nanoholes in it. The bottom nanohole has a primary obstruction applied to it (18). A plasmon (30) is propagating along the surface of the nanofilm towards the bottom nanohole. There is plasmon detection (32), immediately before the area of primary obstruction in the bottom nanohole, and an external computational system (13).

Operation of Eighth Embodiment—FIG. 8

This setup can be used to see if plasmons (30) are correctly propagating towards the nanoholes (18) in a nanofilm (14) by plasmon detection (32) reporting to the external computational system (13).

Figure 9:
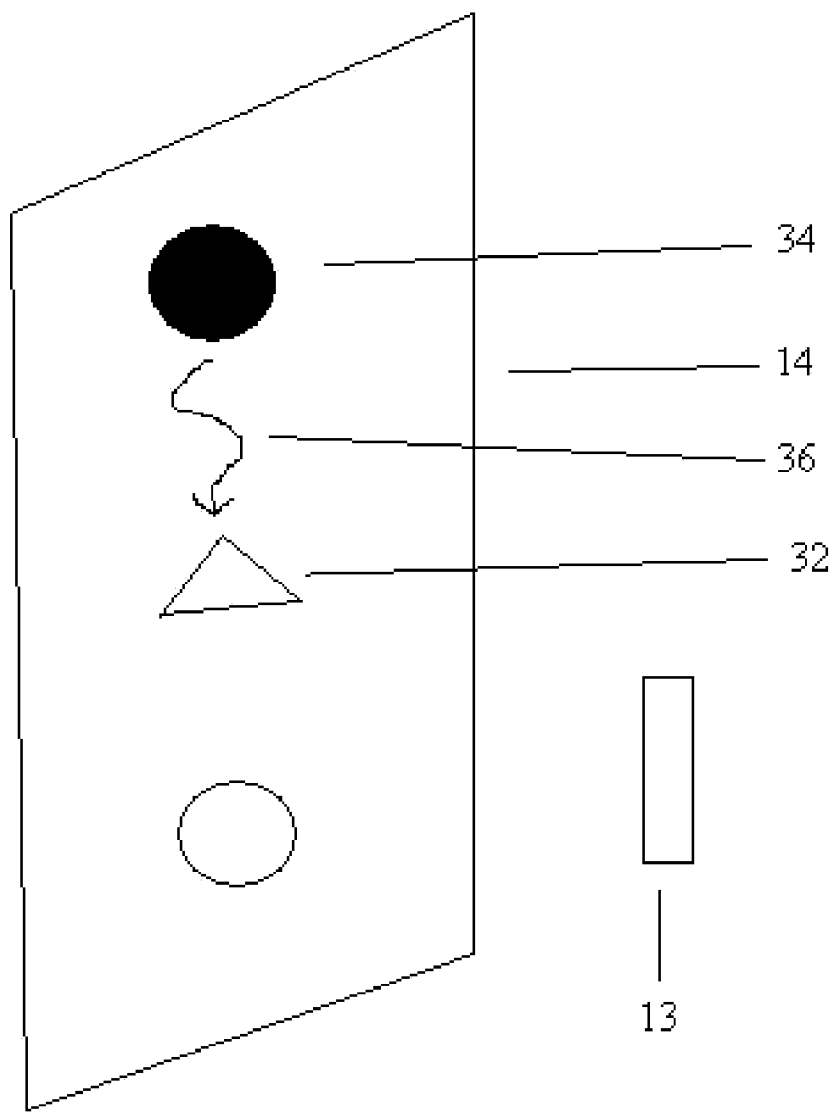
FIG. 9 shows plasmon detection immediately after the area of a malfunctioning primary obstruction.

Ninth Embodiment—FIG. 9

FIG. 9 shows the back side of a nanofilm (14) with two nanoholes in it. There is a malfunctioning primary obstruction (34). There is a plasmon propagating along the back side of the nanofilm (36). There is a plasmon detection (32) immediately after the area of malfunctioning primary obstruction, and an external computational system (13).

Operation of Ninth Embodiment—FIG. 9

The operation of FIG. 9 is very similar to FIG. 8. The plasmon detection (32) will report the presence of the plasmon (36), on the back side of the nanofilm (14) to the external computational system (13), indicating that the primary obstruction is not functioning properly (34).

Throughout the operation of embodiments 2-9, you could monitor everything with the user interface of the external computational system.

I claim:

1. A method for insuring reliability of data and reliability of data processing in plasmonic quantum computational data representation components, and/or plasmonic quantum computational data operation components, comprising:
    a. providing a structure of plasmonic quantum computational data representation components, and/or plasmonic quantum computational data operation components,
    b. providing a primary obstruction, or primary obstructions of photons and/or plasmons within the structure,
    c. the primary obstruction or the primary obstructions triggering a further obstruction, or further obstructions of photons and/or plasmons at a location or locations along a path or paths that photons and/or plasmons would traverse from said primary obstruction, or from said primary obstructions, as if said primary obstruction, or as if said primary obstructions had malfunctioned and been absent or not in full effect,
    whereby said plasmonic quantum computational data representation components, and/or said plasmonic quantum computational data operation components produce correct results even if some said plasmonic quantum computational data representation components, and/or some said plasmonic quantum computational data operation components lack proper functionality of said primary obstruction, or said primary obstructions.

2. The method for insuring reliability of data and reliability of data processing in plasmonic quantum computational data representation components, and/or plasmonic quantum computational data operation components of claim 1, further comprising:
    a. an intrinsic function of said plasmonic quantum computational data representation components, and/or said plasmonic quantum computational data operation components, triggering the further obstruction, or the further obstructions,
    whereby said plasmonic quantum computational data representation components, and/or said plasmonic quantum computational data operation components produce correct results even if some said plasmonic quantum computational data representation components, and/or some said plasmonic quantum computational data operation components lack proper functionality to make said primary obstruction, or said primary obstructions.

3. The method for insuring reliability of data and reliability of data processing in plasmonic quantum computational data representation components, and/or plasmonic quantum computational data operation components of claim 1, further comprising:
    a. an external computational system that is communicating with said primary obstruction, or said primary obstructions, and/or said further obstruction, or said further obstructions,
    b. said external computational system controlling said primary obstruction, or said primary obstructions, and/or said further obstruction, or said further obstructions,
    c. said external computational system implementing obstruction decisions based on the communication data that provide correct functionality even if the ability of a component or components to make said primary obstruction or said primary obstructions fails,
    whereby said plasmonic quantum computational data representation components, and/or said plasmonic quantum computational data operation components produce correct results, even if some said plasmonic quantum computational data representation components, and/or some said plasmonic quantum computational data operation components lack proper functionality to make said primary obstruction, or said primary obstructions.

4. The method for insuring reliability of data and reliability of data processing in plasmonic quantum computational data representation components, and/or plasmonic quantum computational data operation components of claim 3, further comprising:
    a. a photon detector or photon detectors and/or a plasmon detector or plasmon detectors that are detecting photons and/or plasmons in the propagation path or paths of photons and/or plasmons immediately before the area or areas of said primary obstruction, or said primary obstructions, and/or said further obstruction, or said further obstructions, b. said photon detector or said photon detectors and/or said plasmon detector or said plasmon detectors reporting the presence and/or absence of photons and/or plasmons to said external computational system, c. said external computational system implementing obstruction decisions based on said communication data and/or the reported data that provide correct functionality even if the ability of said component or said components to make said primary obstruction or said primary obstructions fails, whereby said plasmonic quantum computational data representation components, and/or said plasmonic quantum computational data operation components produce correct results even if some said plasmonic quantum computational data representation components, and/or some said plasmonic quantum computational data operation components lack proper functionality to make said primary obstruction, or said primary obstructions.

5. The method for insuring reliability of data and reliability of data processing in plasmonic quantum computational data representation components, and/or plasmonic quantum computational data operation components of claim 4, further comprising:

a. said external computational system implementing obstruction decisions that save energy by excluding the step or steps to make said primary obstruction, or said primary obstructions that are not functional, whereby said plasmonic quantum computational data representation components, and/or said plasmonic quantum computational data operation components save energy and produce correct results even if some said plasmonic quantum computational data representation components, and/or some said plasmonic quantum computational data operation components lack proper functionality to make said primary obstruction, or said primary obstructions.

6. The method for insuring reliability of data and reliability of data processing in plasmonic quantum computational data representation components, and/or plasmonic quantum computational data operation components of claim 3, further comprising:

a. said external computational system communicating the information it has gathered and the decisions it has made to a person through a user interface, whereby said person is aware of decisions made by said external computational system and is aware of everything said external computational system knows about said plasmonic quantum computational data representation components, and/or said plasmonic quantum computational data operation components.

7. The method for insuring reliability of data and reliability of data processing in plasmonic quantum computational data representation components, and/or plasmonic quantum computational data operation components of claim 4, further comprising:

a. said external computational system communicating information it has gathered and decisions it has made to said person through said user interface, whereby said person is aware of decisions made by said external computational system and is aware of everything said external computational system knows about said plasmonic quantum computational data representation components, and/or said plasmonic quantum computational data operation components.

8. The method for insuring reliability of data and reliability of data processing in plasmonic quantum computational data representation components, and/or plasmonic quantum computational data operation components of claim 5, further comprising:

a. said external computational system communicating said information it has gathered and said decisions it has made to said person through said user interface, whereby said person is aware of decisions made by said external computational system and is aware of everything said external computational system knows about said plasmonic quantum computational data representation components, and/or said plasmonic quantum computational data operation components.

* * * * *